(12) United States Patent
Morrison et al.

(10) Patent No.: US 7,855,977 B2
(45) Date of Patent: Dec. 21, 2010

(54) ALARMING IN A FEMTO CELL NETWORK

(75) Inventors: Patrick Shane Morrison, Marietta, GA (US); Kurt Donald Huber, Kennesaw, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 114 days.

(21) Appl. No.: 12/184,472

(22) Filed: Aug. 1, 2008

(65) Prior Publication Data

US 2010/0027431 A1    Feb. 4, 2010

(51) Int. Cl.
    *G06F 11/00* (2006.01)
(52) U.S. Cl. .................. 370/252; 370/328; 455/445
(58) Field of Classification Search ............. 370/310.2, 370/328, 329, 331, 332, 333, 252; 455/444, 455/445, 446
    See application file for complete search history.

(56) References Cited

U.S. PATENT DOCUMENTS

| | | | | |
|---|---|---|---|---|
| 6,014,558 | A * | 1/2000 | Thomas | 455/410 |
| 7,532,895 | B2 * | 5/2009 | Hrastar | 455/456.1 |
| 2007/0025287 | A1 * | 2/2007 | Goren et al. | 370/328 |
| 2007/0097938 | A1 * | 5/2007 | Nylander et al. | 370/338 |
| 2008/0102834 | A1 * | 5/2008 | Bernhard et al. | 455/436 |
| 2009/0047955 | A1 * | 2/2009 | Frenger et al. | 455/436 |
| 2009/0047968 | A1 * | 2/2009 | Gunnarsson et al. | 455/446 |
| 2009/0111525 | A1 * | 4/2009 | Hwang et al. | 455/561 |
| 2009/0131049 | A1 * | 5/2009 | Osborn | 455/435.1 |
| 2009/0196221 | A1 * | 8/2009 | Horn et al. | 370/328 |
| 2009/0196245 | A1 * | 8/2009 | Ji | 370/329 |
| 2009/0310565 | A1 * | 12/2009 | Huo et al. | 370/331 |
| 2009/0318124 | A1 * | 12/2009 | Haughn | 455/418 |
| 2010/0008317 | A1 * | 1/2010 | Bhattad et al. | 370/329 |
| 2010/0027469 | A1 * | 2/2010 | Gurajala et al. | 370/328 |
| 2010/0027521 | A1 * | 2/2010 | Huber et al. | 370/338 |
| 2010/0103834 | A1 * | 4/2010 | Gorokhov et al. | 370/252 |

* cited by examiner

*Primary Examiner*—Chi H. Pham
*Assistant Examiner*—Kevin Mew

(57) ABSTRACT

System(s) and method(s) are provided to monitor operation quality of a femto cell network. Operational data received from deployed femto cell access points are aggregated and monitored. Performance rules and associated operational quality indicators (OQIs) facilitate establishing a standard or desired quality of operation. Performance rule(s) comprises weight(s), sampling test(s), and alarm threshold(s) which can be established by a network operator. Collected data on telecommunication performance metrics can be analyzed to identify or calibrate a standard of operation, which facilitates generating performance rule(s). Weight(s) facilitates reducing the scope of operation data that is effectively monitored. OQIs can assess at least one of service quality, capacity, mobility, or provisioning in a femto cell network. Monitoring operational data generates actionable information for the femto cell network. Alarm(s) are generated when one or more OQIs adopt values below associated alarm thresholds. Alarm(s) facilitate prevention of service degradation of the femto cell network.

29 Claims, 9 Drawing Sheets

| 310 |
|---|
| OPERATION QUALITY INDICATORS |
| SERVICE QUALITY ← 315 |
|     SPEECH QUALITY |
|     DROPPED CALLS |
|     RAB ESTABLISHMENT |
|     CONVERSATIONAL QUALITY |
|     CALL SETUP TIME |
|     CALL END TIME |
| MOBILITY ← 325 |
|     HANDOVER FAILURE/DROPS |
|     INTERRUPTION TIME |
| CAPACITY ← 335 |
|     GATEWAY NODE(S) LOAD |
| PROVISIONING ← 345 |
|     PROVISIONING TIME |
|     LOCATION LOCKUP TIME |
|     RECOVERY TIME |
| SPECIFIC FEATURES ← 355 |

FIG. 3

ALARMING IN A FEMTO CELL NETWORK

TECHNICAL FIELD

The subject innovation relates to wireless communications and, more particularly, to efficiently gauging performance of a femto cell network through generation of alarms based on performance rules for aggregated operational data of multiple femto cell access points.

BACKGROUND

Femto cells—building-based wireless access points interfaced with a wired broadband network—are generally deployed to improve indoor wireless coverage, and to offload a mobility radio access network (RAN) operated by a wireless service provider. Improved indoor coverage includes stronger signal and improved reception (e.g., voice or data), ease of session or call initiation, and session or call retention as well. Offloading a RAN reduces operational and transport costs for the service provider since a lesser number of end users utilizes over-the-air radio resources (e.g., radio frequency channels), which are typically limited.

Coverage of a femto cell, or femto access point (AP), is generally intended to be confined within the bounds of an indoor compound (e.g., a residential or commercial building) in order to mitigate interference among mobile stations covered by a macro cell and terminals covered by the femto AP. Additionally, confined coverage can reduce interference among terminals serviced by disparate, neighboring femto cells as well. Femto cells typically operate in licensed portions of the electromagnetic spectrum, and generally offer plug-and-play installation; e.g., automatic configuration of femto AP subsequent to femto cell subscriber registration with a service provider. Coverage improvements via femto cells can also mitigate customer attrition as long as a favorable subscriber perception regarding voice coverage and other data services with substantive delay sensitivity is attained. In addition, a richer variety of wireless voice and data services can be offered to customers via a femto cell since such service offerings do not rely primarily on mobility RAN resources.

Substantial exploitation of the foregoing efficiencies provided by femto cells depends at least in part on adequate performance or service of a femto cell network, which can be achieved or exceeded through monitoring technical and commercial aspects of operation of the femto cell network. In contrast to standard telecommunication networks designed and deployed for outdoors macro coverage, like a Universal Mobile Telecommunication System macro network or a Global System for Mobile Communication macro network, in which various performance metrics can be monitored for up to $10^3$-$10^5$ base stations per network management unit (e.g., a radio network controller), in a femto coverage deployment a substantially larger number of access points is to be monitored. Aspects of monitoring a femto cell network such as measurement(s) aggregation, data storage, report generation, etc., can lead to cumbersome (e.g., complicated performance rules) and expensive implementations which can hinder achieving or exceeding adequate operation quality.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject innovation provides system(s) and method(s) to monitor operation quality of a femto cell network. Operational data received from deployed femto cell access points are aggregated and monitored; aggregation and monitoring take place within a femto cell network platform. Performance rule(s) and operational quality indicator(s) (OQI) facilitate establishing a standard or desired quality of operation. Performance rule(s) comprises weight(s), sampling test(s), and alarm threshold(s) which can be established by a network operator. Collected data on telecommunication performance metrics (e.g., block error rate, packet loss rate, signal-to-noise ratio, signal-to-noise-and-interference ratio . . . ) can be analyzed to identify or calibrate a standard of operation, which facilitates generating performance rule(s). Weight(s) within a performance rule facilitates reducing the scope of operational data that is effectively monitored, by assigning substantial weight to a fraction of APs from which operational data is received. In an aspect of the subject innovation, to optimize control of operation quality, performance rules can be targeted to subscriber segments based at least in part in utilization data of femto resources, contracted services (e.g., add-on features for femto cell), commercial history (e.g., subscriber longevity, credit history, service payment history, . . . ). Operational intelligence, such as reports on operation trends and forecasted operation quality, that results from monitoring operational data embodies actionable information and can be retained. A component generates and conveys alarm(s) when one or more operational quality indicators adopt values below associated alarm thresholds. Alarm(s) or warnings facilitate addressing and resolving conditions that can degrade service quality of the femto cell network.

Aspects, features, or advantages of the subject innovation can be exploited in substantially any wireless communication technology; e.g., Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), or Zigbee. Additionally, substantially all aspects of the subject innovation can be exploited in legacy telecommunication technologies.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF DRAWINGS

FIG. 3 presents illustrative example categories of operational quality indicators in accordance with aspects disclosed herein.

DETAILED DESCRIPTION

Figure 1:
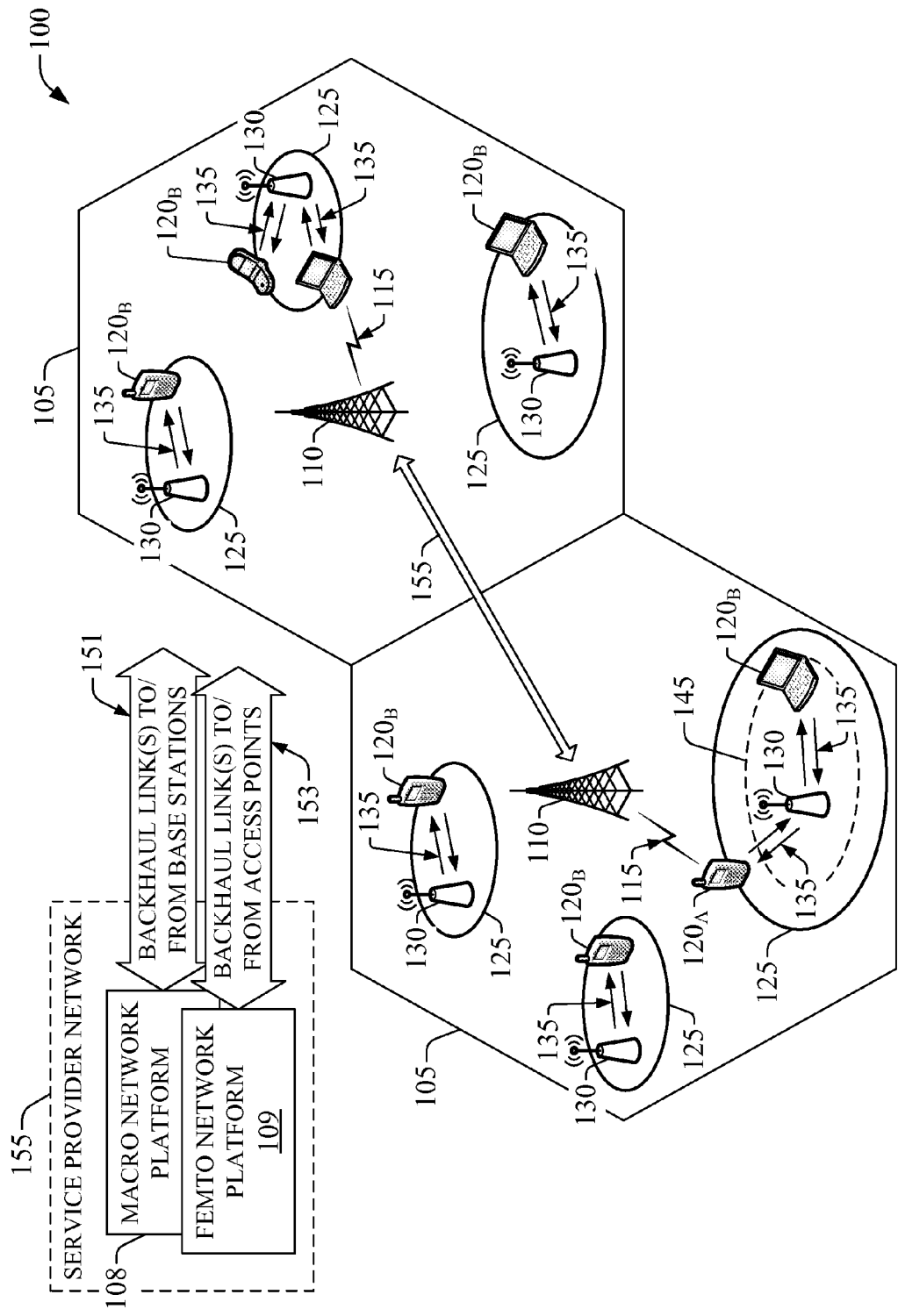
FIG. 1 illustrates a wireless environment that includes macro cells and femto cells for wireless coverage in accordance with aspects described herein.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," "service," "framework," "interface," "connector," and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," "subscriber station," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth. As utilized herein, the term "prosumer" indicate the following contractions: professional-consumer and producer-consumer.

In addition, the terms "wireless network" and "network" are employed interchangeably in the subject application, when context wherein the term is utilized warrants distinction for clarity purposes such distinction is made explicit. Likewise, the terms "femto cell access point" and "femto access point" are also utilized interchangeably.

Referring to the drawings, FIG. 1 illustrates a wireless environment that includes macro cells and femto cells for wireless coverage in accordance with aspects described herein. In wireless environment 100, two areas 105 represent "macro" cell coverage, each macro cell is served by a base station 110. It should be appreciated that macro cells 105 are illustrated as hexagons; however, macro cells can adopt other geometries generally dictated by the deployment or floor plan, geographic areas to be covered (e.g., a metropolitan statistical area (MSA) or rural statistical area (RSA)), and so on. Macro coverage is generally intended to serve mobile wireless devices, like UE $120_A$, in outdoors locations. An over-the-air wireless link 115 provides such coverage, the wireless link 115 comprises a downlink (DL) and an uplink (UL), and utilizes a predetermined band of the radio frequency (RF) spectrum. As an example, UE $120_A$ can be a Third Generation Partnership Project (3GPP) Universal Mobile Telecommunication System (UMTS) mobile phone. It is noted that a base station, its associated electronics, circuitry or components, and a wireless link operated in accordance to the base station form a radio access network (RAN). In addition, base station 110 communicates via backhaul link(s) 151 with a macro network platform 108, which in cellular wireless technologies (e.g., 3rd Generation Partnership Project (3GPP) Universal Mobile Telecommunication System (UMTS), Global System for Mobile Communication (GSM)) represents a core network. In an aspect, macro network platform 108 controls a set of base stations 110 that serve either respective cells or a number of sectors within such cells. Macro network platform 108 also communicates with other base stations (not shown) that serve other cells (not shown). Backhaul link(s) 151 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ). Backhaul pipe(s) 155 link disparate base stations 110.

In wireless environment 100, within one or more macro coverage cell 105, a set of femto cell 125 served by respective femto access points (APs) 130 can be deployed. While in illustrative wireless environment 100 three femto cells are deployed per macro cell, aspects of the subject innovation are geared to femto cell deployments with substantive femto AP density, e.g., $10^4$-$10^8$ femto APs 130 per base stations 110. A femto cell 125 typically covers an area that includes confined area 145, which is determined, at least in part, by transmission power allocated to femto AP 130, path loss, shadowing, and so forth. While coverage area 125 and confined area 145 typically coincide, it should be appreciated that in certain deployment scenarios, coverage area 125 can include an outdoor portion (e.g., a parking lot, a patio deck, a recreation area such as a swimming pool and nearby space) while area 145 spans an enclosed living space. Coverage area typically is spanned by a coverage radius that ranges from 20 to 100 meters. Confined coverage area 145 is generally associated with an indoor space such as a building, either residential (e.g., a house, a condominium, an apartment complex) or business (e.g., a library, a hospital, a retail store), which encompass a setting that can span about 5000 sq. ft.

A femto AP 130 typically serves a few (for example, 1-5) wireless devices (e.g., subscriber station $120_B$) within confined coverage area 125 via a wireless link 135 which encompasses a downlink and an uplink. A femto network platform 109 can control such service, in addition to mobility handover from macro-to-femto handover and vice versa, and registration and provisioning of femto APs. Control, or management, is facilitated by backhaul link(s) 153 that connect deployed femto APs 130 with femto network platform 109. Backhaul pipe(s) 153 are substantially the same as backhaul link(s) 151. In an aspect of the subject innovation, part of the control effected by femto AP 130 measurements of radio link conditions and other performance metrics. Femto network platform 109 also includes components, e.g., nodes, gateways, and interfaces, that facilitates packet-switched (PS) (e.g., internet protocol (IP)) traffic and signaling generation for networked telecommunication. It should be appreciated that femto network platform 109 can be femto AP 130 can integrate seamlessly with substantially any packet switched (PS)-based and circuit switched (CS)-based network such as macro network platform 108. Thus, operation with a wireless device such as $120_A$ is substantially straightforward and seamless when handover from femto-to-macro, or vice versa, takes place. As an example, femto AP 130 can integrate into an existing 3GPP Core Network via conventional interfaces like Iu-CS, Iu-PS, Gi, Gn. It is to be noted that substantially all voice or data active sessions associated with subscribers within femto cell coverage (e.g., area 125) are terminated once the femto AP 130 is shut down; in case of data sessions, data can be recovered at least in part through a buffer (e.g., a memory) associated with a femto gateway at the femto network platform. Coverage of a suspended or hotlined subscriber station or associated account can be blocked over the air-interface. However, if a suspended or hotlined customer who owns a femto AP 130 is in Hotline/Suspend status, there is no substantive impact to the customers covered through the subject femto AP 130. In another aspect, femto AP 130 can exploit high-speed downlink packet access either via an interface with macro network platform 108 or through femto network platform 109 in order to accomplish substantive bitrates.

In addition, in yet another aspect, femto AP 130 has a LAC (location area code) and RAC (routing area code) that is different from the underlying macro network. These LAC and RAC are used to identify subscriber station location for a variety of reasons, most notably to direct incoming voice and data traffic to appropriate paging transmitters, and emergency calls as well. As a subscriber station (e.g., UE $120_A$) that exploits macro coverage (e.g., cell 105) enters femto coverage (e.g., area 125), the subscriber station (e.g., UE $120_A$) attempts to attach to the femto AP 130 through transmission and reception of attachment signaling. The signaling is effected via DL/UL 135; in an aspect of the subject innovation, the attachment signaling can include a Location Area Update (LAU) and/or Routing Area Update (RAU). Attachment attempts are a part of procedures to ensure mobility, so voice calls and data sessions can continue even after a macro-to-femto transition or vice versa. It is to be noted that UE $120_A$ can be employed seamlessly after either of the foregoing transitions. In addition, femto networks typically are designed to serve stationary or slow-moving traffic with reduced signaling loads compared to macro networks. A femto service provider (e.g., an entity that commercializes, deploys, or utilizes femto access point 130) is therefore inclined to minimize unnecessary LAU/RAU signaling activity at substantially any opportunity to do so, and through substantially any available means. It is to be noted that substantially any mitigation of unnecessary attachment signaling/control is advantageous for femto cell operation. Conversely, if not successful, UE $120_A$ is generally commanded (through a variety of communication means) to select another LAC/RAC or enter "emergency calls only" mode. It is to be appreciated that this attempt and handling process can occupy significant UE battery, and femto AP capacity and signaling resources (e.g., communication of pilot sequences) as well.

When an attachment attempt is successful, UE $120_A$ is allowed on femto cell 125, and incoming voice and data traffic are paged and routed to the subscriber through the femto AP 130. To facilitate voice and data routing, and control signaling as well, successful attachment can be recorded in a memory register, e.g., a Visitor Location Register (VLR), or substantially any data structure stored in a network memory. It is to be noted also that packet communication (e.g., voice and data traffic, and signaling) typically paged/routed through a backhaul broadband wired network backbone 140 (e.g., optical fiber backbone, twisted-pair line, T1/E1 phone line, digital subscriber line (DSL) either synchronous or asynchronous, an asymmetric DSL, a coaxial cable . . . ). To this end, femto AP 130 is typically connected to the broadband backhaul network backbone 140 via a broadband modem (not shown). Through backhaul pipe 153, a femto AP 130 can handle substantially any quality of service (QoS) for heterogeneous packetized traffic (e.g., various, multiple packet flows). In an aspect of the subject innovation, femto AP 130 can display status indicators for power, active broadband/DSL connection, and gateway connection. In another aspect, no landline is necessary for femto AP 130 operation.

Figure 2:
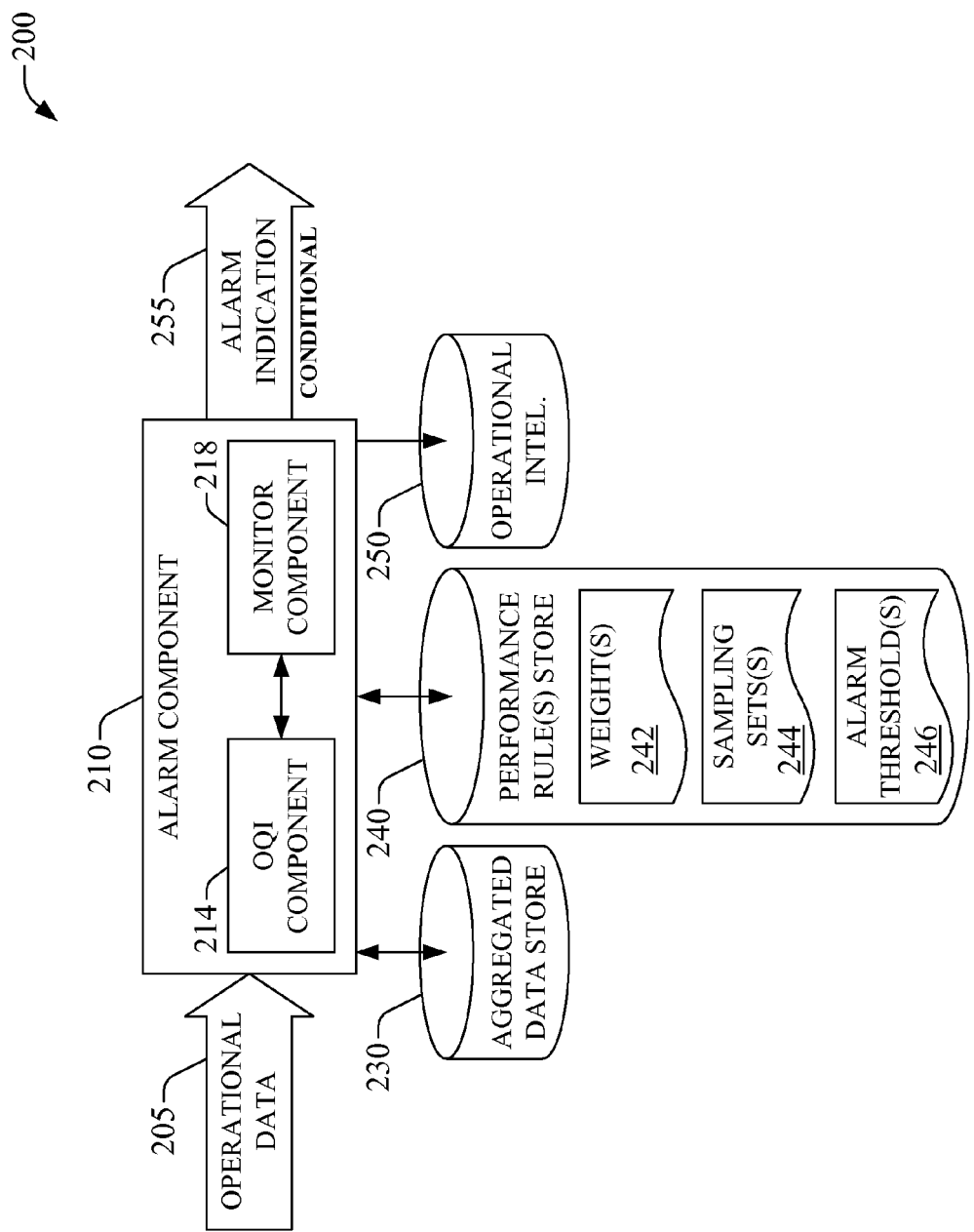
FIG. 2 is a block diagram of an example system that gauges service or operation quality of a femto cell network in accordance with aspects of the subject innovation.

FIG. 2 illustrates a block diagram of an example system 200 that gauges service or operation quality of a femto cell network and issues an alarm when the quality, as measured through an operation quality indicator, is below a threshold. In example system 200, an alarm component 210 receives operational data 205 associated with a femto cell network performance and provided service. It should be appreciated that the number of femto APs from which operational data 205 can be collected is typically 2-3 orders of magnitude larger than the number of macro base stations controlled by a macro network management component (e.g., a macro gateway node) in a macro network platform. Operational data 205 includes performance metrics for telecommunication via deployed femto cell APs (e.g., femto AP 130); for example, the metrics include DL or UL bit error rate(s), packet error rate(s), or block error rate(s); DL or UL packet loss rate; link loss/recovery rate; performance metrics for DL and UL such as reference/sounding signal over thermal noise (RSOT), reference/sounding signal received power (RSRP), reference/sounding signal strength indicator (RSSI); rate controlled static priority; and so forth. In addition, operational data 205 can include (i) mobility data; (ii) service provisioning and configuration data; and (iii) subscriber feedback and associated customer service response.

Operational data 205 can be received from one or more network components (e.g., femto gateway node(s)) that can reside in femto network platform 109 and operate a set of deployed femto APs (e.g., femto AP 130). Received operational data 205 can be stored in aggregated data store 230.

Alarm component 210 can include a component 214 that can generate and store an operational quality indicator, or select an existent OQI. An OQI is a function that evaluates operation or service quality. In an aspect, a network operator, or service provider, establishes an OQI. The function that defines an OQI can output numeric or logic values, the function is based at least in part on a set or performance rules, stored in performance rule(s) store 240. It should be noted that logic values can be suitable for OQI that assess whether execution of a specific action is successfully completed; e.g., handover attachment, femto AP registration, determination of geographic location of a femto AP, etc.

A performance rule can include at least three elements: (i) Weight(s) 242, (ii) sampling set(s) 244, or probe ensemble(s), and (iii) alarm threshold(s) 246. Weight(s) 242.—This parameter in a performance rule determines a number of femto APs that are deemed to provide a statistically significant representation of performance. A weight is a fraction of the total number of femto APs for which data is aggregated. Thus, a weight reduces the scope of the received data that is effectively monitored. In an aspect of the subject innovation, weight(s) 242 typically are O(1%); e.g., 1-3%. However, it should be appreciated that weight(s) 242 can adopt substantially any value up to the net number of femto APs for which data is received. Sampling set(s) 244.—A set of one or more performance units comprise sampling set(s) 246. Such performance unit(s) is defined through metrics associated with operation of a femto cell AP (e.g., femto AP 130). As an example, a performance unit can be a set of CS or PS voice calls (e.g., 10 voice calls). As another example, a processor load within a gateway node in a femto network platform 109 can be a performance unit. As a further example, a performance unit can be a set of attachment attempts, as measured through initiation and resolution of LAU/RAU procedure(s). Alarm threshold(s) 246.—These alarm thresholds are configurable values that determine a boundary at which operation or service of a femto cell network, as measured by one or more OQIs, can start to degrade. Alarm thresholds 246 are typically configured by a network operator, or service provider, and can be time- and space-dependent. Values of alarm threshold(s) 246 can be determined based at least in part on (I) analysis of performance of a control, or training set of femto APs, (II) subscriber type, historic data, which can include rate of alarm condition(s) for specific OQIs, and (III) heuristics, particularly at early stages of deployment of a femto cell network.

It should be noted that subscriber input, e.g., exchanges with customer service agents, which can be included in operational data 205, can be utilized to adjust performance rule(s).

Monitor component 218 observes values of a set of one or more OQIs in accordance with received operational data 205 and performance rules associated with the OQIs. Alarm component 210 conveys an alarm indication 255 when an OQI value for a femto AP is below an alarm threshold 246 configured for the OQI, and a number of femto APs dictated by weight(s) 242, e.g., a fraction of the net number of femto APs from which operational data 205 is received, exhibits an OQI below threshold. In addition, when an OQI is a logical variable, an alarm can be triggered when the logical variable adopts a fail condition. In an aspect, monitor component 218 can select specific operational data in two different modes: (a) Passive and (b) active. In passive mode, monitor component 218 can select data on specific performance metrics once alert component 210 has received the operational data 205. In active mode, monitor component 218 can request specific data associated with a desired performance quality indicator. In an aspect, active mode can be utilized at least in the following instances. (i) During initial stages (e.g., beta tests) of deployment in which specific aspects of operational quality are monitored, or (ii) after an alarm indication has been triggered, for example, to conduct a root-cause analysis of conditions that led to the alarm, and substantially any analysis that can lead to corrective measures to recover service or operation quality. Analysis can be conducted by monitor component 218, or a dedicated analysis component (not shown).

Additionally, alarm component 210 can retain operational intelligence 250, e.g., reports and analysis, e.g., accomplished via an analysis component (not shown), of triggered alarms and associated OQI that exhibited values below threshold. In addition, analysis included in operation intelligence 250 can present projection analysis of OQIs at-risk of failure.

Alarm indication 255 can be conveyed to a macro or femto network management component (e.g., an operations and maintenance (O&M) server), or a device (e.g., a mobile of a network administrator) that operates in the macro or femto cell network. In addition, alarm indication 255 can be configurable, with the format and content dependent at least in part upon the OQI associated with the alarm, or the component that received the indication. For example, the alarm indication 255 and can be embodied in a set of multi-bit words, a graphical or audible token, a short message service (SMS) communication, a multimedia message service (MMS) communication, an email message, an instant message, and so on.

It should be appreciated that alarm component 210 can include a processor (not shown) that can confer, at least in part, the described functionality of alarm component 210 and substantially any other component included therein or functionally connected to alarm component 210. The processor (not shown) can execute code instructions stored in a memory, or memory component, to provide such functionality.

FIG. 3 presents a listing 310 of illustrative example categories of operation quality indicators. It should be appreciated that other categories of OQIs are also possible. Next, the illustrative example categories are discussed in conjunction with example associated performance rules.

(I) Service Quality 315. This example category of OQI includes speech quality, dropped calls, radio access bearer (RAB) establishment, conversational quality, call setup time, and call end time. Dropped call(s) OQI can be divided in voice calls and data sessions. For voice call, a performance unit associated with the voice dropped call(s) OQI can be a composite unit that includes femto network (e.g., femto platform network 108) initiated call, a macro network (e.g., macro platform network 109) initiated call. A probe ensemble, or sample set 242, can include K (with K a positive integer) calls per 24 hour period. The OQI for dropped call(s) can be characterized via function which is the ratio among the sum of femto and macro initiated calls that are dropped, and successfully established calls. It should be appreciated that successfully established calls are those calls for which a RAB has been established and conveyed to a network management component within a network platform. An alarm threshold associated with the dropped call(s) OQI can be set to a value of the order of a few percents. A weight can be set to a fraction of the femto APs served by a gateway node that initiates the call.

Data dropped call(s) OQI can be determined in substantially the same manner as voice dropped call(s) OQI. It should be noted, however, that for data sessions can be dropped, e.g., abnormally terminated, by a macro radio access network (e.g., universal terrestrial radio access network (UTRAN)) and its associated macro network platform. Thresholds and weights for performance rules associated with data dropped call(s) OQI can be substantially the same as those for voice dropped call(s) OQI.

In connection with RAB establishment, OQI can be determined for establishment success or failure, and for CS or PS service as well. A performance unit associated with a performance rule related to the RAB establishment OQI, can be RAB attempt. A sampling setting can comprise a predetermined set of attempts within a femto gateway node. A RAB OQI can be characterized via the ratio of RAB successful attempts and RAB attempts, while the RAB OQI for failed RAB establishment can be computed as 1-(RAB OQI success ratio). An alarm threshold associated with RAB OQI can be a specific percentage of RAB establishment success or failure per femto gateway node.

Conversational quality (CQ) OQI can be based at least in part on backhaul quality for packet transport. It should be appreciated that CQ OQI can also be defined for end-to-end assessment of conversational quality. A performance unit can be transmission quality (TQ) report packet, which can convey voice and call quality. As an example, a TQ report packet can exploit RTCP-XR (Real-time Transport Protocol Control Protocol Extended Reports) format. For end-to-end assessment, PESQ (Perceptual Evaluation of Speech Quality) scoring for a mean opinion score (MOS) can be utilized to determine performance unit. A sampling set for CQ OQI can be a set of TQ report packets for a femto AP received at a femto gateway node. In an aspect, CQ OQI can be characterized via the MOS for call quality generated in an RTCP-XR TQ report packet, or a MOS-PESQ scoring. In such scenario, an alarm threshold associated with CQ OQI can be established within the bounds of MOS for call quality.

With respect to call setup time, an OQI can be defined as the time interval $\Delta t_{if}$ between a connection request from a service femto AP (e.g., a Radio Resource Controller request through a random access channel (RACH) procedure) and a stop message (e.g., CC alerting). Call setup can be associated with a mobile-to-telephony-network (e.g., public switched telephone network (PSTN)) or a mobile-to-mobile connection. A performance unit can be a timer that starts with the first signaling instruction to setup a call, and ends with reception of a stop message. A probe ensemble, or sampling set 242, can comprise a set of calls place through a set of subscriber stations served by a femto cell. An alarm threshold associated with the call setup time OQI can be an upper bound for $\Delta t_{if}$ of the order of few seconds.

Call end time OQI can be determined in substantially the same manner as call setup time OQI. Suitable signaling events dictate termination request and termination resolution of a call. Performance units, performance ensemble or sampling set, and thresholds are substantially the same as for call setup OQI.

(II) Mobility 325.—In this example category, OQIs can be defined to evaluate femto-to-macro successful and unsuccessful handover. OQIs can address inter-system (e.g., femto network to UTRAN) and intra-radio-access-technology (RAT) handovers for CS and PS calls or data sessions. It should be appreciated that various sources (e.g., physical channel failure, protocol error . . . ) can lead to unsuccessful handover. Each source can be evaluated through specific ad hoc measurements. In an aspect, a performance unit associated with a performance rule related to a handover OQI can be a single voice call or data session. A probe ensemble, or sampling set 244, can include M (with M a positive integer) voice calls or data sessions served through a single femto AP. For unsuccessful handover, an OQI can be characterized via the ratio of number of unsuccessful handover and handover attempts. OQI for successful handover can be characterized in a similar manner. A threshold for handover OQI can be defined as a success rate with respect to the computed ratio described above. A weight associated with a handover performance rule or OQI can be a few percentage of femto cells server by a femto gateway node.

Mobility 325 can include interruption time as an OQI, the interruption time refers to a time gap in speech or data transmission as a result of handover. While for data sessions an interruption in data transfer is generally tolerable, interruption time in speech can result in poor perceived service quality by a subscriber. A performance unit for interruption time can be the time span $\Delta t_{gap}$ of interrupted communication, and a probe ensemble can comprise a set of femto APs. An interruption time OQI can be characterized as the either the average or largest $\Delta t_{gap}$ for the probe ensemble. An example threshold for the interruption OQI so asymmetric with respect to DL and UL and can be of the order of a few hundred milliseconds.

(III) Capacity 335.—This OQI example category includes a femto gateway node(s) load as an indicator of operation quality of a femto cell network. The load refers to a processor load for processor(s) that confers at least part of the functionality to femto gateway node(s), which reside within a femto cell network platform 109. It should be appreciated that this OQI does not rely upon explicit telecommunication performance metrics (e.g., RSSP, RSOT, etc.) for femto cell(s). Femto gateway node(s) load can be measured for control and user planes. For each plane, two performance units can be defined: mean processor load and peak processor load. Each of these performance units rely, at least in part, on measurement taken on a set of time interval $\Delta t$, which can be determined by a network operator. For control plane, processor can be associated with a cell provisioning server, or an O&M server. For the user plane, the processor can be associated with an application(s) server. It should be noted that performance units determine, at least in part, OQIs.

As an example, OQI can be the ratio of load over computing capacity of the processor platform available to femto gateway node(s); an alarm threshold can be 0.8; and a weight associated with the OQI and threshold can equal the number of femto APs served by, or committed to one femto gateway node. It should be noted that threshold and weight can be different for control and user planes.

(IV) Provisioning 345.—The OQI example category can include at least the following: provisioning time, location lockup time, and recovery time. With respect to provisioning time, such OQI is directed towards a determination of a time span for assignment of a unique identifier to a femto AP (e.g, femto AP 130) added to the femto cell network (e.g, femto network platform 109), or a femto AP that is reconfigured and requires a new identifier. The assignment can be accomplished via a femto gateway node. Such provisioning OQI is a functional OQI. In an example scenario, a performance unit is the provisioning time itself, and the function that defines the OQI equals the performance unit. In an aspect, a performance ensemble (e.g., sampling set 244) can include substantially all femto APs assigned a unique identifier within a predetermined time interval, which can be reset daily. A performance rule threshold can be $\Delta t_{th}^{(prov)}=1$ min, and the weight can be equal to 0.08 of the APs in the performance ensemble. It should be appreciated that that the performance ensemble can also be defined based at least in part on location of femto APs that are assigned a unique identifier. It should be further appreciated that the performance ensemble, the threshold, and the weight can adopt other values other than those described in the above scenario.

In connection with location lockup time, such OQI is directed towards a determination of a time span for assignment of a unique identifier to a femto AP (e.g, femto AP 130) added to the femto cell network (e.g, femto network platform 109), or a femto AP that is reconfigured and requires a new identifier. Such provisioning OQI is a functional OQI. In an aspect, a performance unit is the time spanned by a femto AP to acquire and communicate (e.g., lockup) its location when first connected to the femto cell network, or when reconfiguration requires a location to be reacquired for operation (e.g., the femto AP is moved to a disparate location as a result of the subscriber moving from a first residence to a second residence). In addition, a performance ensemble can include substantially all femto APs acquired by subscribers that reside in a specific area in a time interval of 24 hours; for example, the area is known to a network operator to have a substantive interference environment, e.g., a heavily populated neighborhood in a metropolitan area. Moreover, an OQI threshold can be $\Delta t_{th}^{(location)}=20$ min., and a weight can include 3% of the APs that incur a time longer than the threshold. It should be appreciated that the performance ensemble, the threshold, and the weight can adopt other values other than those described in the above scenario.

Recovery time includes re-establishment of telecommunication upon at least one of link loss or power loss. In an aspect, link loss can be determined through measurements over a set of time-frequency resources of signal-to-noise ratio(s) (SNRs), measured through RSOT, signal-to-interference ratio(s) (SINRs), measured through RSSI, or signal-to-noise-and-interference ratio, in conjunction with a signal strength tolerance that indicates when signal strength is inadequate for telecommunication. Thus, for example, a performance unit can be embodied in a SNR measurement over a resource block, as defined in the 3GPP Long Term Evolution wireless technology. As another example, a performance unit can be a measurement of RSSI over a predefined number of frames $N_F$, e.g., $N_F=100$ which in 3GPP UMTS span 1 second. A performance ensemble can be defined as a specific number Q (a positive integer, e.g., 5) of signal strength measurements, and a link-loss OQI threshold can be determined as Q consecutive measurements below signal strength tolerance, and represented through an accumulation function. Thus, link recovery takes place when less than Q consecutive radio link measurements below tolerance are realized. The threshold can be determined for a single femto AP or for a set of APs; for instance, $\Delta t_{th}^{(Lloss)}$ can be utilized as a threshold for Q consecutive measurements a single femto AP (e.g., femto AP 130), or for an average of Q measurements in various femto APs. It should be appreciated that other definitions of link loss can be utilized to determine an OQI associated with time recovery and link loss.

Likewise, an OQI for power loss can be introduced. Measurements of transmitted power over a set of time-frequency resources can be conducted in a telecommunication and contrasted with a power tolerance which indicates power loss; for instance, RSRP can be probed over a resource block, or during a specific time interval for a set of channels either localized or interleaved. A power unit can be one such measurement. A performance ensemble can be defined as a specific number P (a positive integer) of measurements of received power through a pilot signal, and an OQI performance threshold can be determined as P consecutive measurements that yield data below signal strength tolerance; OQI can be represented through an accumulation function. Thus, power recovery takes place when less than P consecutive measurements of RSRP below tolerance are realized. It should be appreciated that power loss can be evaluated for substantially any network component (e.g., within RAN or within a network platform; e.g., femto network platform 109) through measurements of a time to acquire signal from one or more femto APs after a power outage. As an example, a threshold for a power-loss OQI can be an interval $\Delta t_{th}^{(Ploss)}$, either for a single femto AP or for an average synchronization time for a set of femto APs. It should be appreciated that other definitions of power loss can be introduced to determine an OQI associated with time recovery and link loss.

(V) Specific features 355.—Various OQIs can be defined to evaluate automated configuration of information associated with the operation, and authorization to operate, a femto cell within a macro cell environment. Such information includes, for example, RF environment scan(s), determination of femto neighbor lists, scrambling codes. Operational quality indicators for such functionality can be logical values (e.g., PASS/FAIL, HIGH/LOW, YES/NO, . . . ). Such OQI can be determined in accordance with specific underlying wireless technology of the macro network, like UMTS, GSM, or UMB. In addition to OQIs for automated neighbor list generation, specific-feature OQIs include handover redirection from femto network to the underlying macro network, with specific OQIs based at least in part on the wireless technology of the macro network. Moreover, OQIs can be introduced to assess macro-to-femto handover performance and ensure macro network operation fails to degrade upon the various measurements associated with femto cell selection for handover and related management of multiple femto APs in candidate set for handover. Furthermore, specific features 355 can include OQIs to ensure proper management of emergency calls (e.g., enhanced 911). In an aspect, OQIs and associated performance rules can be directed to evaluate preemption of normal calls attached to femto APs in favor of emergency calls. For instance, OQI can assess functionality of femto-to-macro handover of traffic served by a femto AP (e.g., femto AP 130) that can cause congestion in the femto AP. Proper function and execution of such handover can ensure a mobile that attempts an emergency call can have access to the femto AP. Further yet, specific features 355 can include OQIs that address automation of femto AP configuration procedures, and access to a service provider's femto cell network. Such OQIs can have logical or numeric values, based at least in part on performance units and performance ensembles.

Figure 4:
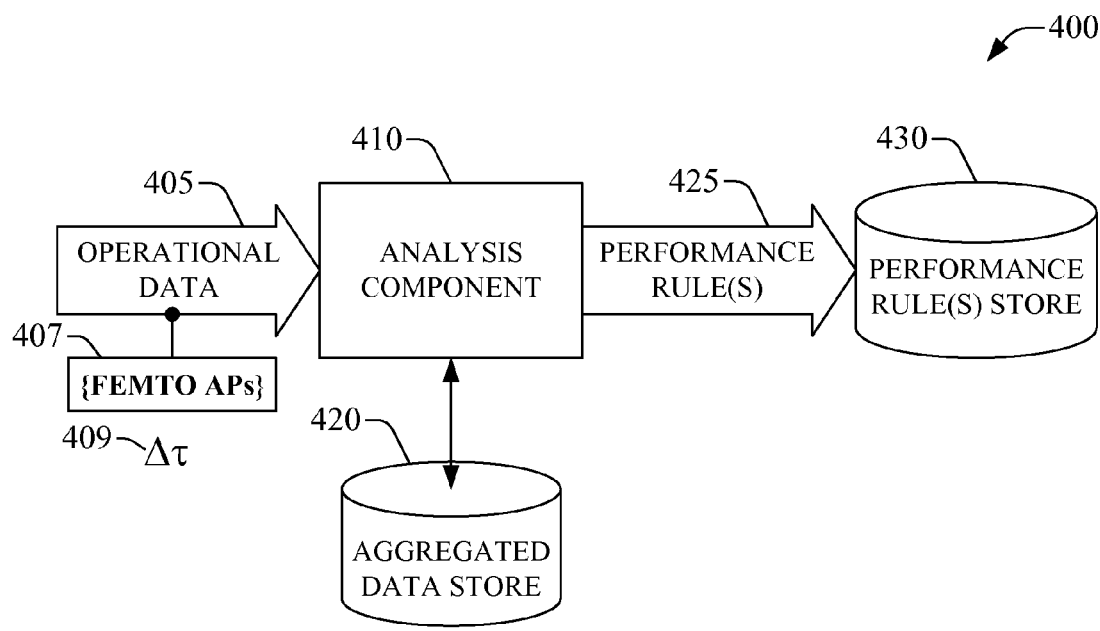
FIG. 4 is a block diagram of an example system that facilitates generation of performance rule(s) to gauge service or operation quality of a femto cell network in accordance with aspects described herein.

FIG. 4 is a block diagram of an example system 400 that facilitates generating performance rule(s) to gauge service or operation quality of a femto cell network. In system 400, an analysis component 410 receives operational data 405 for a set of femto APs 407 for a specific time interval $\Delta\tau$ 409. Analysis component 410 can reside within an alarm component, or within substantially any component of macro network platform 108 or femto network platform 109. The set of femto APs 407 can include a portion of the deployed femto APs in a femto cell network. The collection time interval $\Delta\tau$ 409 can span a continuous term, or can be a discretized time interval (e.g., a set of predetermined time slots, such as the last 12 Thursdays; a set of 4 weekends, which can facilitate adjustment of a performance rule(s) to increased residential femto cell traffic; or the last 20 night-calling periods, e.g., weekdays from 7:00 p-7:00 a; and so on). To analyze the received operational data 405, analysis component 410 can aggregate it in aggregated data store 420, which is substantially the same as data store 230. Analysis component 410 analyzes the aggregated data to generate performance rule(s) 425, which is stored in a performance rule(s) store 430.

Analysis component 410 can apply substantially any mathematical algorithm for analysis of time-series from disparate sources (e.g., each access point in femto APs set 407). The algorithms can reside in a memory component (not shown) within analysis component 410, or in substantially any component within macro network platform 108 or femto network platform 109 that can be functionally connected to analysis component 410. It is noted that analysis component 410 can include a processor, or be functionally connected to a processor, which can confer, at least in part, analysis component 410 its functionality. In an aspect, data analysis is geared towards identification of standards of normal operation of the femto cell network for various conditions. It should be appreciated that the normalcy of the femto cell network operation is affected by various interrelated factors such as interference environment in femto cell and underlying macro cell network; power allocation for femto cell AP transmitter(s); subscriber type; geographical locus of deployment (e.g., urban, metropolitan, or rural area); seasonal influences (e.g., time of day, climatic season, which can affect, e.g., foliage surrounding buildings in which femto APs operate and thus change interference environment(s), . . . ); and so forth. Among the example methodologies that analysis component 410 can employ for analysis are the following. (i) Computation of statistics of data distribution such as momenta (average, variance and standard deviation, . . . ). It should be appreciated that average computation can also include geometric averages and rolling averages. (ii) Calculation of time and space correlations, which can reveal effects of (a) subscriber mobility (e.g., visitation history, attachment attempts, . . . ), (b) frequency or other radio resource reuse, (c) interference conditions at the macro cell level, femto cell level, or a combination thereof, etc. (iii) Extraction of patterns or clusters of operational features; e.g., reiterated macro-to-femto attachment attempts in certain areas wherein femto APs are deployed in multi-story buildings in urban environment(s).

Performance rule(s) 425 includes weight(s), alarm threshold(s), and sampling set(s) that can reflect expected normal operation extracted from the foregoing data analysis conducted by analysis component 410.

Figure 5:
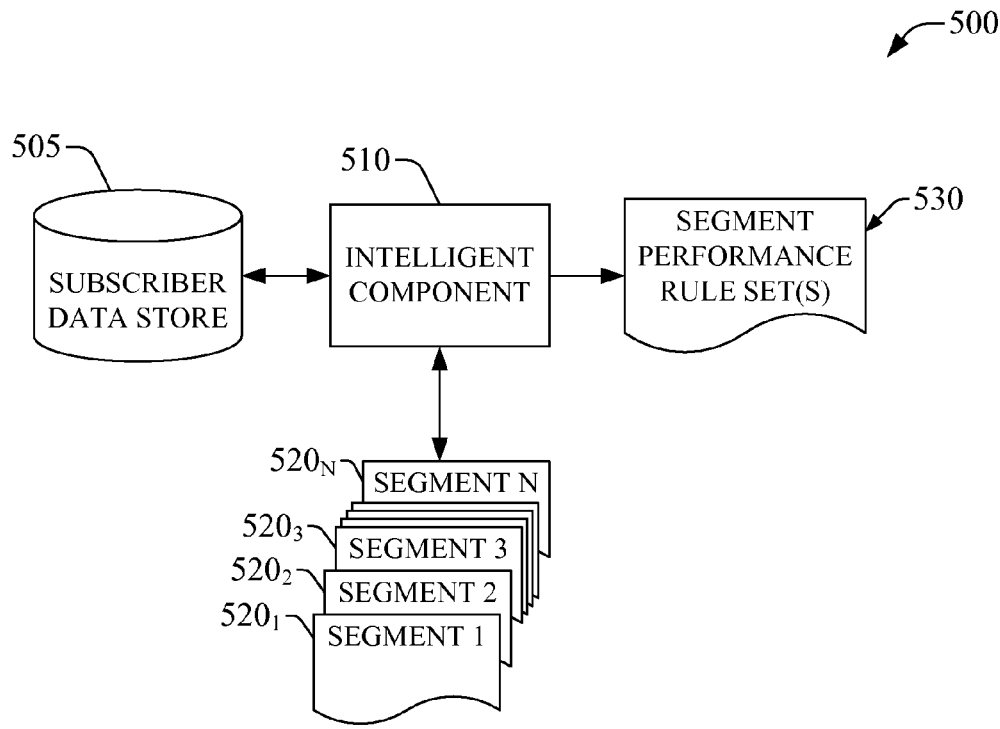
FIG. 5 is a block diagram of an example system that customizes performance rule set(s) for subscriber segments in accordance with aspects of the subject innovation.

FIG. 5 is a block diagram of an example system 500 that customizes performance rule set(s) for subscriber segments. Intelligent component 510 collects subscriber intelligence from a subscriber data store 505, which can reside in a macro network platform 108 or a femto network platform 109, or it can be a part of the network operator's business platform(s) or partnership(s). Intelligent component 510 can reside within alarm component 210, analysis component 410, or substantially any component of macro network platform 108 or femto network platform 109. Subscriber intelligence refers to information that characterizes history or behavior of an agent, generally a human agent, or an entity and to records of commercial and non-commercial activities involving a product or service, or a combination thereof, of the agent or entity. As an illustration, subscriber intelligence can comprise (i) usage and type of contracted wireless plans (e.g., voice, data, voice and data; residential or business, etc.), including add-on features; (ii) mapping of femto access points utilized by the subscribers; (iii) various demographics, such as age groups, commercial transaction history and associated metrics (e.g., credit history, credit score), education level which can reflect level of technological savvy and willingness to contract new services; (iv) cultural background, and so on.

Intelligence component 510 segments subscribers at least in part in accordance to commonalities or patterns in one or more of the intelligence topics (i)-(iv). To that end intelligence component 510 can exploit artificial intelligence (AI) methods to infer (e.g., reason and draw a conclusion based upon a set of metrics, arguments, or known outcomes in controlled scenarios) suitable segments $520_1$-$520_N$. Artificial intelligence techniques typically apply advanced mathematical algorithms—e.g., decision trees, neural networks, regression analysis, principal component analysis (PCA) for feature and pattern extraction, cluster analysis, genetic algorithm, or reinforced learning—to a data set; e.g., the collected subscriber intelligence in the case of subscriber segmentation.

In particular, to effect subscriber segmentation and generate segments $520_1$-$520_N$, intelligent component 510 can employ one of numerous methodologies for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited.

In addition, intelligent component 510 can exploit subscriber segmentation to generate a set of performance rules associated with various operational quality indicators for each segment. Performance rules so determined can optimize soft alarming for each segment $520_\lambda$ ($\lambda=1, 2 \ldots N$), which can result in at least the advantage of lesser customer attrition. As an example, alarm thresholds for femto cells associated with business customers can set to lower values as compared to thresholds for residential subscribers with sporadic use of femto APs. Therefore, a business segment can be more closely monitored. It should be appreciated that thresholds can be adjusted to provide more prominent monitoring to substantially any selected segment, e.g., customers that contracted service no earlier than 12 weeks. Weights within a performance rule can also be customized for each segment $520_\lambda$.

In view of the example systems described above, example methodologies that can be implemented in accordance with the disclosed subject matter can be better appreciated with reference to flowcharts in FIGS. 6-9. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a methodology disclosed herein could alternatively be represented as a series of interrelated states or events, such as in a state diagram. Moreover, interaction diagram(s) may represent methodologies in accordance with the disclosed subject matter when disparate entities enact disparate portions of the methodologies. Furthermore, not all illustrated acts may be required to implement a methodology in accordance with the subject specification. Further yet, two or more of the disclosed methodologies can be implemented in combination with each other, to accomplish one or more features or advantages herein described. It should be further appreciated that the methodologies disclosed throughout the subject specification are capable of being stored on an article of manufacture to facilitate transporting and transferring such methodologies to computers for execution by a processor or for storage in a memory.

Figure 6:
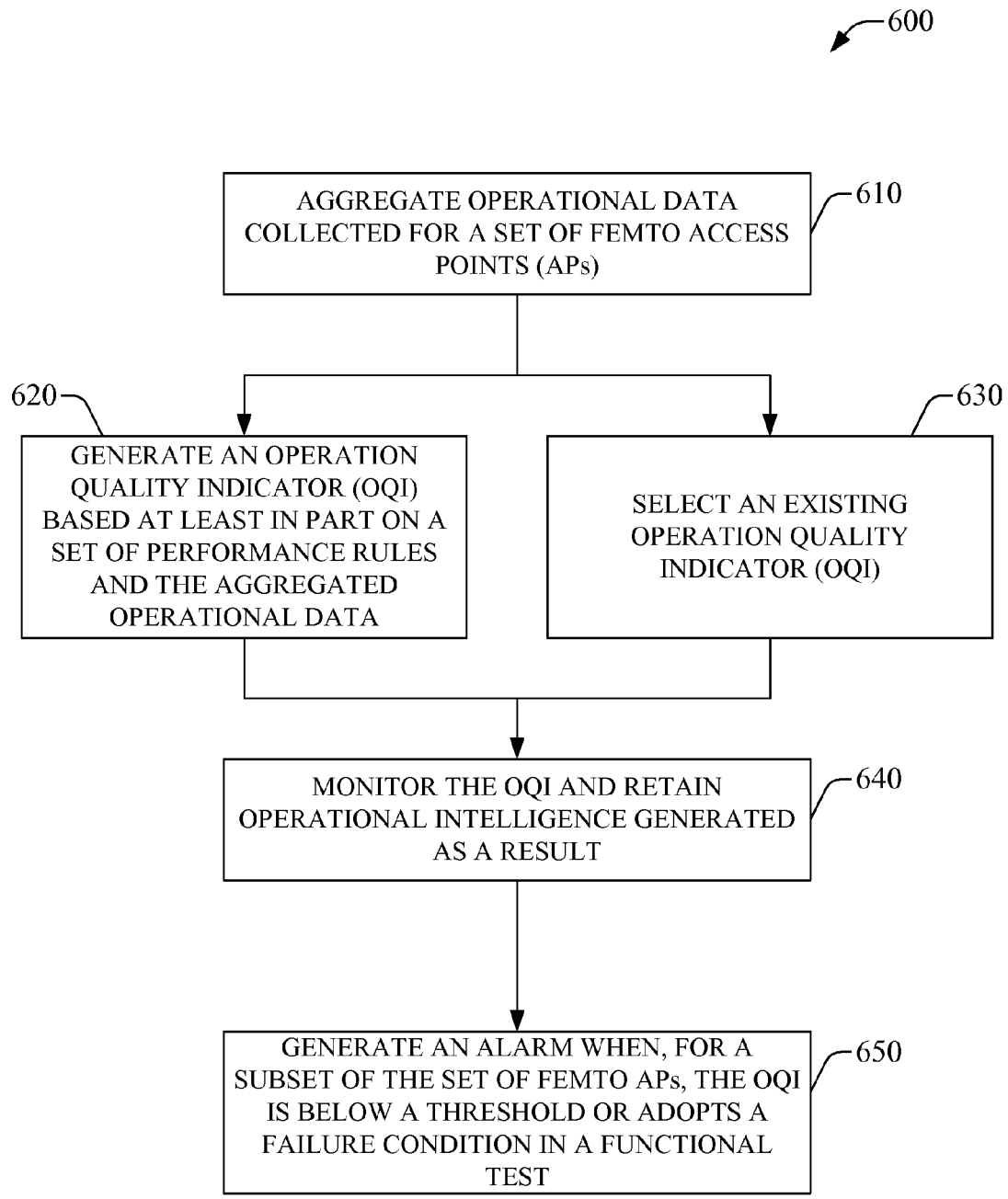
FIG. 6 presents an example flowchart of a method for issuing an alarm related to operation quality in a femto cell network according to aspects disclosed herein.

FIG. 6 presents a flowchart of an example method 600 for issuing an alarm related to operation quality in a femto cell network according to aspects disclosed herein. At act 610, operational data collected for a set of operational femto APs is aggregated. Operation data includes telecommunication data on performance metric(s); e.g., SNR, SINR, packet loss rate, block error rate, packet error rate, bit error rate, etc. Operation data also includes femto AP acquisition times, femto-to-macro and macro-to-femto attachment data, link loss recovery time, power loss recovery time, and so on. The set of operational APs corresponds to substantially all the femto APs controlled by a set of one or more femto network management components (e.g., a femto cell gateway node(s)) in a femto network platform. In an aspect of the subject innovation, the set of femto APs comprises a substantive number of elements, e.g., $10^4$-$10^9$; it should be appreciated the upper bound is typically 2-3 orders of magnitudes larger than the number of macro base stations controlled by a macro network management component (e.g., a macro gateway node) in a macro network platform.

At act 620, an operation quality indicator (OQI) is generated based at least in part on a set of performance rules and the aggregated data (e.g., aggregated data store 420). As discussed above, an OQI generally is a function of a set of performance units and parameters that characterize a probe ensemble (e.g., sampling set(s) 244) associated with a performance rule. An OQI can adopt numeric or logic values. Specific performance units can be determined based at least in part on a category of OQI (see FIG. 3). For example, for macro-to-femto handover, a unit can be an attachment attempt, which can measure a completed attachment procedure: handover request, assessment and resolution. Thus, a probe ensemble can be a number N (with N a positive integer) of attachment attempts executed by an access point. The OQI in the macro-to-femto handover example can be determined by a ratio of successful attempts over N, or alternatively, failed attempts over N. It should be appreciated that for certain classes of OQI, like mobility OQIs, a single performance unit can comprise a single time interval (e.g., call set up time, call end time, interruption time upon handover) which can be probed for a set of femto APs; measured values of the time interval for the set of APs comprises the probe ensemble.

At act 630, an existing OQI is selected. It should be appreciated that existing can be the result of act 620. In an aspect, existing OQI can be stored in a memory within a macro or femto network platform, or within an OQI component 214.

At act 640, the OQI is monitored and generated operation intelligence is retained. In an aspect, the subject monitoring can be effected by a monitor component (e.g., component 218) in real-time (e.g., as OQI are generated) or in a scheduled manner, e.g., through evaluation of blocks of data on performance metrics and associated OQIs collected over a predetermined time interval. Operational intelligence can include reports on monitored OQI as a function of space and time, or temporal and spatial projections and forecasts of specific OQIs.

At act 650, an alarm is generated and conveyed when the OQI is below a threshold or adopts a logical failure condition (e.g., "FAIL") in a functional test for a subset of the set of operational femto APs. The number of elements in the subset can be dictated by the set of rules, which include alarm thresholds. In an aspect, an alarm can be a set of multi-bit words, a graphical or audible token, a short message service (SMS) communication, a multimedia message service (MMS) communication, an email message, an instant message, and so on. An alarm can be conveyed to substantially any macro or femto network platform component for analysis (e.g., root-cause assessment) of operation conditions that led to the alarm and further testing. Such analysis can also be part of operational intelligence associated with femto cell network performance.

Figure 7:
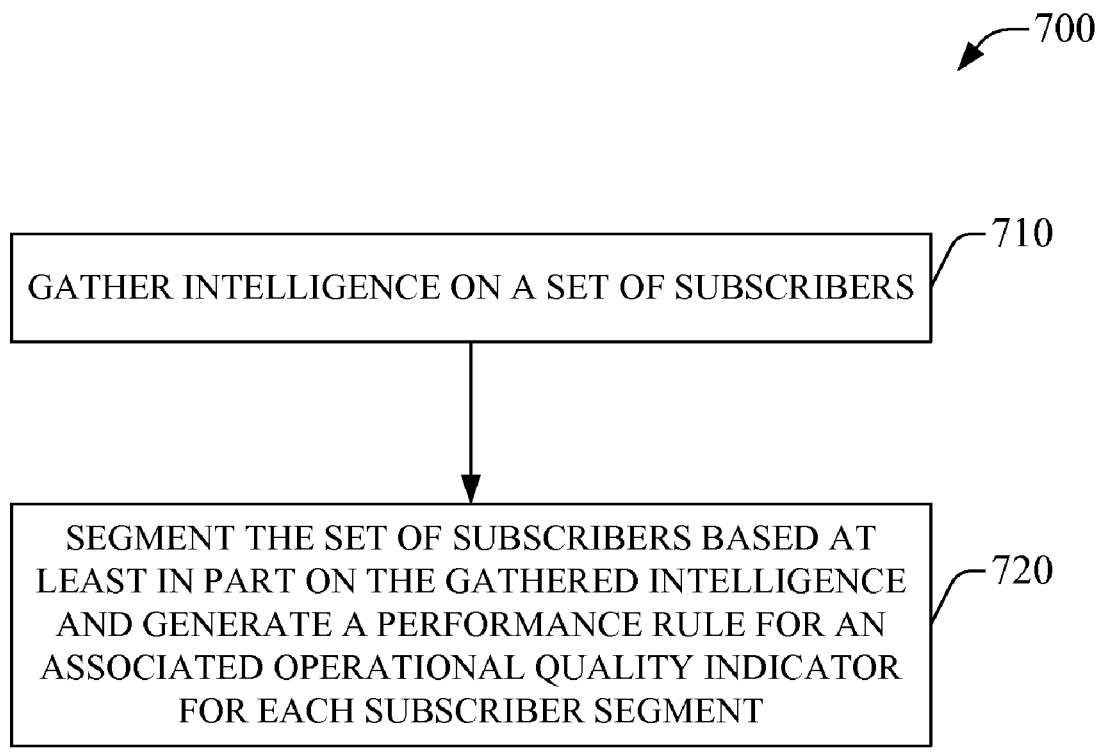
FIG. 7 is a flowchart of an example method for targeting performance rules according to customer segments according to aspects to the subject innovation.

FIG. 7 is a flowchart of an example method 700 for targeting performance rules for subscriber segments according to aspects to the subject innovation. At act 710, intelligence on a set of subscribers is gathered. The intelligence generally includes information on femto cell utilization, subscriber commercial historic data and demographics such as subscriber education level, socioeconomic segment, cultural indicators (e.g., ethnicity, cross-cultural exposure, . . . ), etc. Subscriber intelligence is generally stored in a memory component that can reside within either a macro or femto network platform, or both, or it can originate from a business partner or be acquired from a third party. At act 720, the set of subscribers is segmented and a performance rule for an associated operation quality indicator (OQI) is generated for each subscriber segment. Segmentation is based at least in part on the gathered intelligence and can be performed through an intelligent component (e.g., component 510). In an aspect, subscribers in each segment determine at least in part the number of femto APs that are utilized as a weight metric as part of the performance rule. The performance rule, which includes performance thresholds (e.g., alarm thresholds 246), and probe ensembles (e.g., sampling set(s) 244), which include performance units, can be determined based at least in part on operational features of the segment. For example, if a subscriber segment includes male subscribers with ages between 12-25 years old with contracted video-streaming service and online gaming applications, OQI can include latency-related performance units like radio link recovery, loss packet rate, and peak load of femto AP processor, or processing unit, with a substantially large probe ensemble and low threshold(s).

Figure 8A:
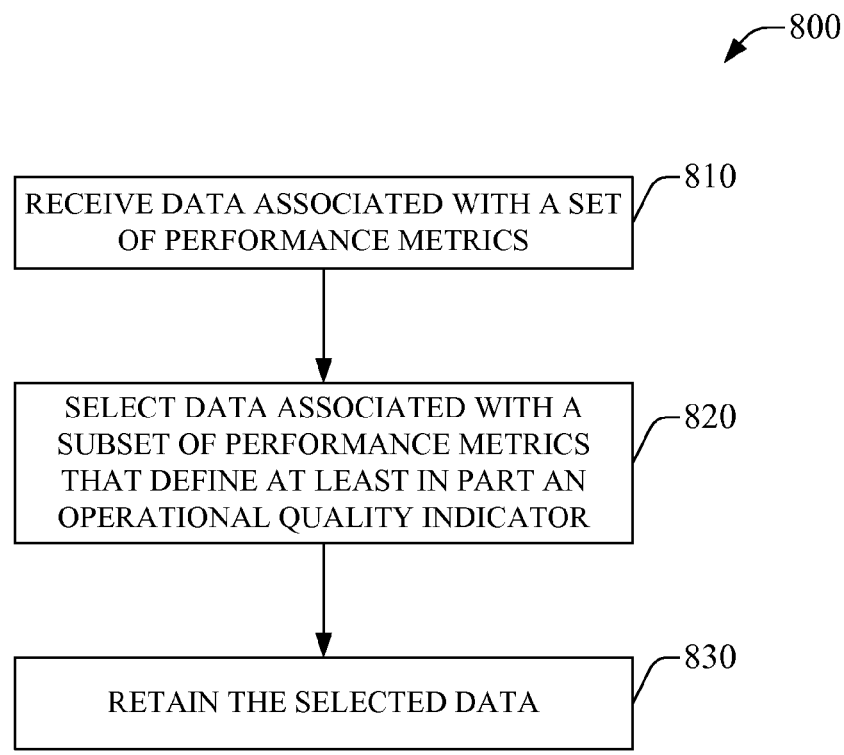
FIGS. 8A and 8B present flowcharts of example methods for aggregating data on operation of femto cells according to aspects of the subject innovation.
Figure 8B:
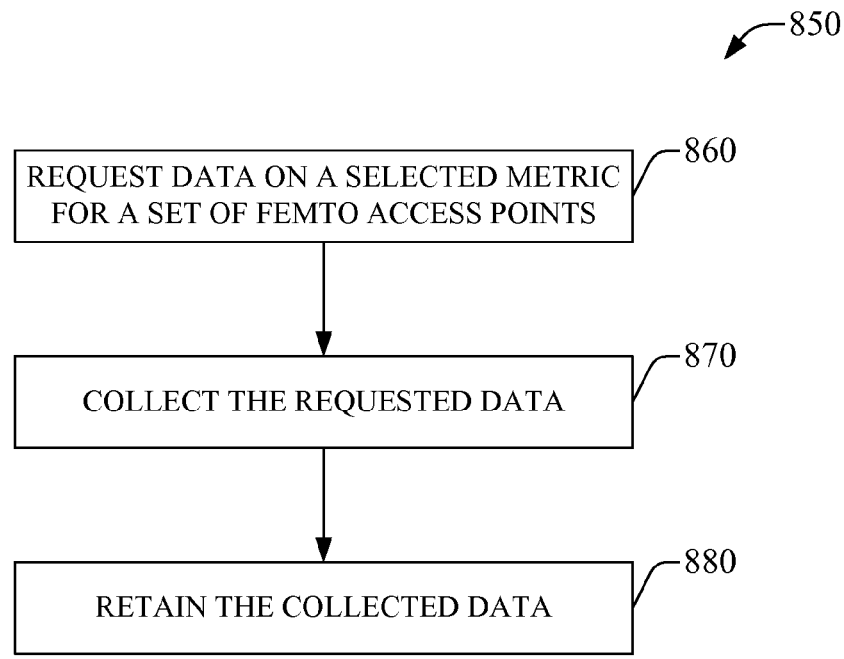

FIGS. 8A and 8B present flowcharts of example methods 800 and 850, respectively, for aggregating data on operation of femto cells. With respect to example method 800, at act 810, data associated with performance metrics are received. At act 820, data associated with a subset of performance metrics that define, at least in part, an operational quality indicator (OQI) are selected. For instance, for a PS-based voice OQI, received NACK indications and CRC values per block can be selected among the received data. As another example, for latency-related OQI, DL/UL radio link recovery/loss data can be drawn. At act 830, the selected data is retained. In aspect, to efficiently retain substantive volumes ($10^2$-$10^5$ TB) of data associated with operation of a femto cell network, data can be compressed through lossless wavelet compression, or substantially any data compression method.

In connection with example methodology 850, at act 860, data on a selected performance metric is selected for a set of femto access points. The set of femto APs can include substantially all femto APs operated by one or more network management components (e.g., femto gateway nodes) within a femto cell network (e.g., femto network platform 109). It should be appreciated that, the number of elements in the set can be of the order $10^6$-$10^8$ femto access points. At act 870, the requested data is collected, and at act 880, the collected data is retained. In an aspect of the subject innovation, to retain efficiently substantive volumes ($10^2$-$10^5$ TB) of collected data associated with operation of a femto cell network, data can be compressed through lossless wavelet compression, or substantially any data compression method.

Figure 9:
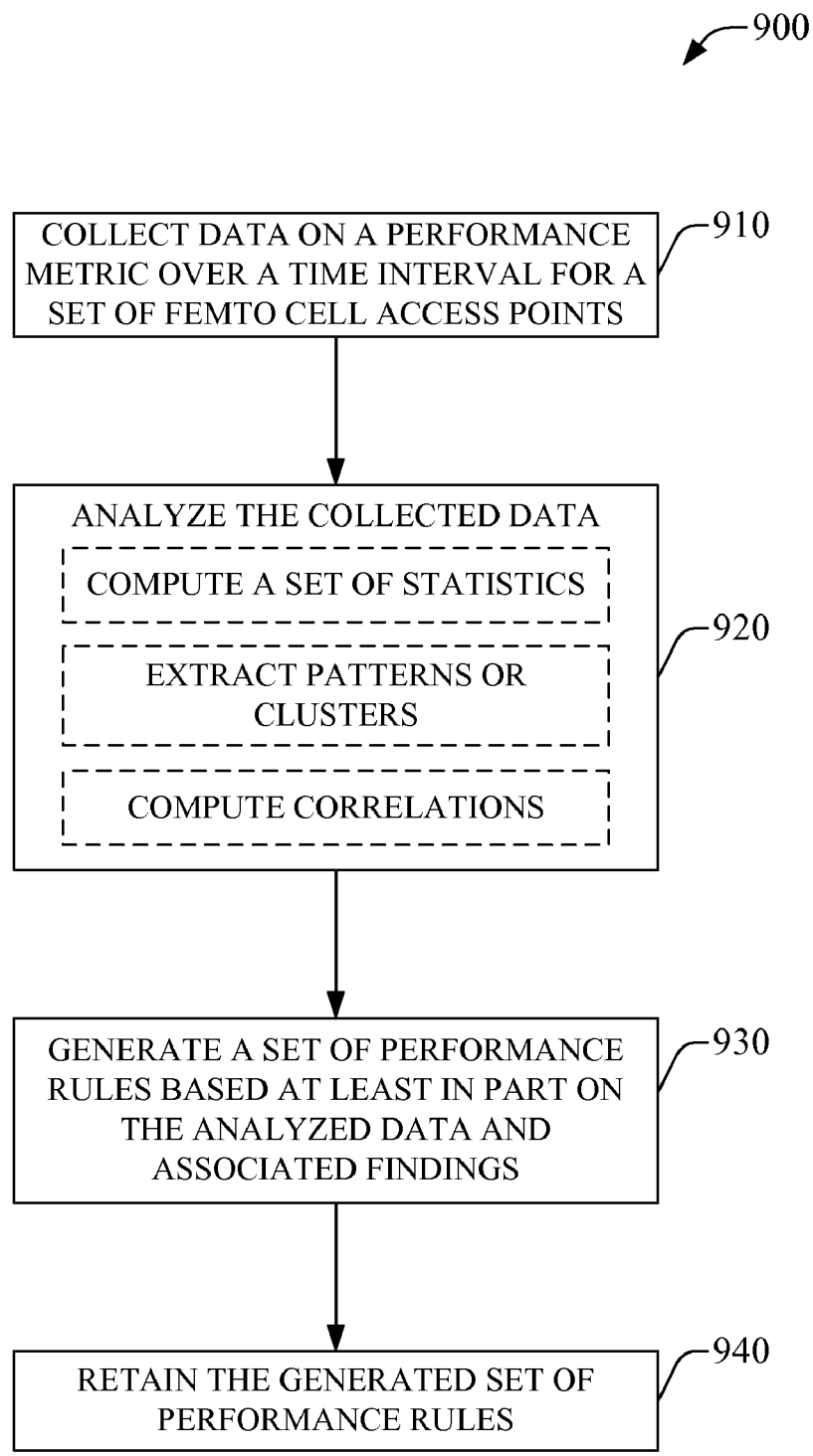
FIG. 9 is a flowchart of an example methodology for creating a performance rule associated with operation quality of a femto cell deployment.

FIG. 9 is a flowchart of an example methodology for creating a performance rule associated with service or operation quality of a femto cell deployment. At act 910, data on a performance metric are collected over a time interval for a set of femto cell access points (see, e.g., FIG. 4). The performance metric can be substantially any metric associated with telecommunication through a femto cell. It should be noted that as the set of femto APs is utilized for performance rule generation, it is generally smaller than a set of femto APs monitored for operation quality, which can include $10^6$-$10^8$ femto APs. At act 920, collected data is analyzed. In an aspect, analysis can be conducted through analysis component 410. Substantially any technique for analysis of time-series from disparate sources (e.g., the femto APs in the set) can be employed. For example, a set of statistics such as data distribution momenta (average, variance and standard deviation, . . . ) can be computed. As another example, time and space correlations can be calculated, such correlations can reveal effects of (i) subscriber mobility (e.g., visitation history, attachment attempts . . . ), (ii) frequency or other radio resource resuse, (iii) interference conditions at the macro cell level, femto cell level, or a combination thereof, and so forth. Yet as another example, patterns and clusters can be extracted. At act 930, a set of performance rules (e.g., weights, alarm thresholds, and sampling set(s)) can be generated based at least in part on the analyzed data and associated findings. At act 940, the generated set of performance rules is retained.

Figure 10:
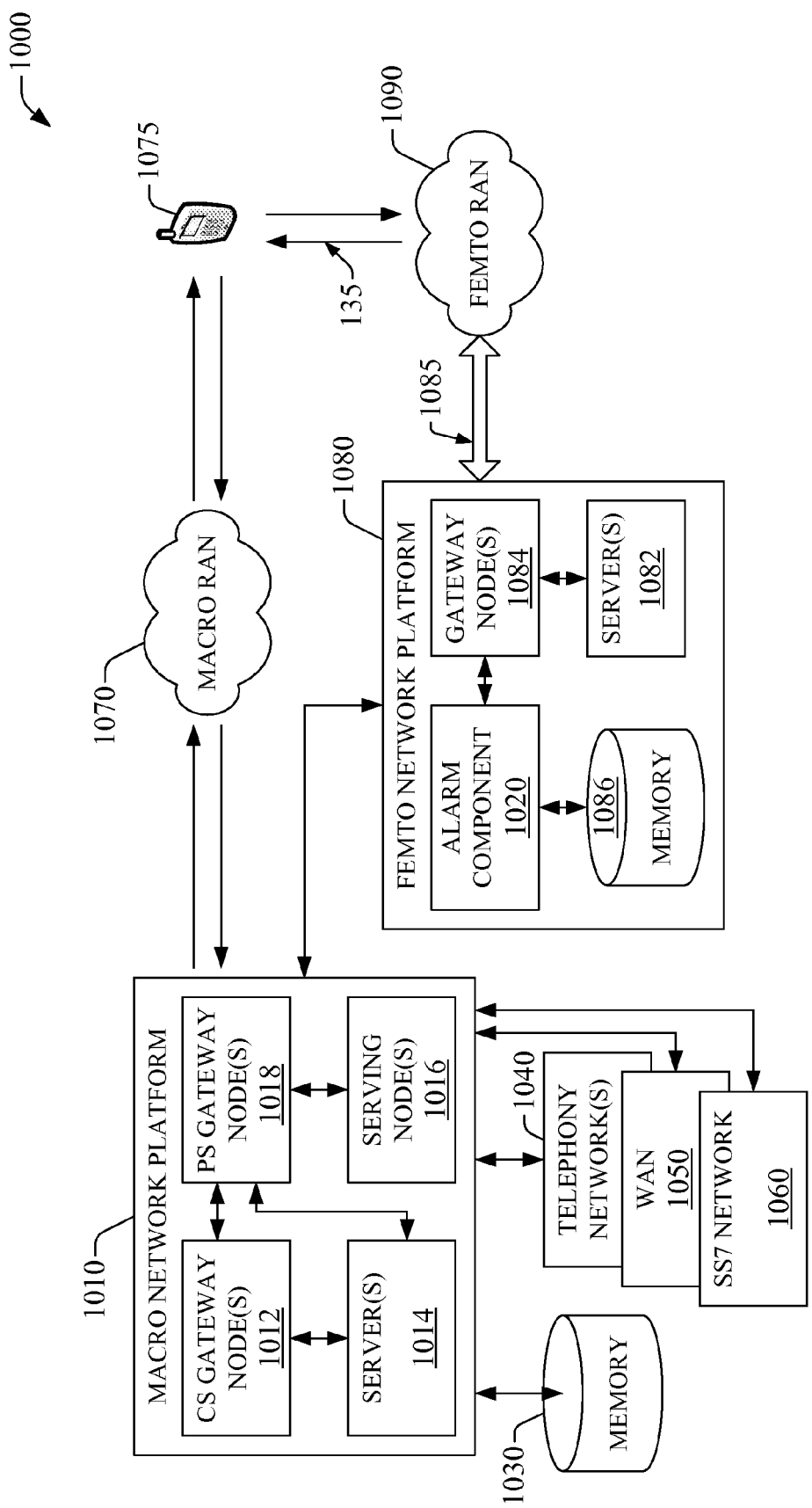
FIG. 10 illustrates an example wireless communication environment with associated components for operation of a femto cell in accordance with aspects described herein.

To provide further context for various aspects of the subject specification, FIGS. 10 illustrates, respectively, an example wireless communication environment 1000, with associated components for operation of macro and femto cell networks, which can exploit various aspects described in the subject specification.

Wireless communication environment 1000 includes two wireless network platforms: (i) A macro network platform 1010 which serves, or facilitates communication) with user equipment 1075 via a macro radio access network (RAN) 1070. It should be appreciated that in cellular wireless technologies (e.g., 3GPP UMTS, HSPA, 3GPP LTE, 3GPP2 UMB), macro network platform 1010 is embodied in a Core Network. (ii) A femto network platform 1080, which can provide communication with UE 1075 through a femto RAN 1090 linked to the femto network platform 1080 via backhaul pipe(s) 1085, wherein backhaul pipe(s) are substantially the same a backhaul link 140. It should be appreciated that femto network platform 1080 typically offloads UE 1075 from macro network, once UE 1075 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 1070 can comprise various coverage cells like cell 105, while femto RAN 1090 can comprise multiple femto cell access points. As mentioned above, it is to be appreciated that deployment density in femto RAN 1090 is substantially higher than in macro RAN 1070.

Generally, both macro and femto network platforms 1010 and 1080 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 1010 includes CS gateway node(s) 1012 which can interface CS traffic received from legacy networks like telephony network(s) 1040 (e.g., public switched telephone network (PSTN), or public land mobile network (PLMN)) or a SS7 network 1060. Circuit switched gateway 1012 can authorize and authenticate traffic (e.g., voice) arising from such networks. Additionally, CS gateway 1012 can access mobility, or roaming, data generated through SS7 network 1060; for instance, mobility data stored in a VLR, which can reside in memory 1030. Moreover, CS gateway node(s) 1012 interfaces CS-based traffic and signaling and gateway node(s) 1018. As an example, in a 3GPP UMTS network, gateway node(s) 218 can be embodied in gateway GPRS support node(s) (GGSN).

In addition to receiving and processing CS-switched traffic and signaling, gateway node(s) 1018 can authorize and authenticate PS-based data sessions with served (e.g., through macro RAN) wireless devices. Data sessions can include traffic exchange with networks external to the macro network platform 1010, like wide area network(s) (WANs) 1050; it should be appreciated that local area network(s) (LANs) can also be interfaced with macro network platform 1010 through gateway node(s) 1018. Gateway node(s) 1018 generates packet data contexts when a data session is established. To that end, in an aspect, gateway node(s) 1018 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 1014. It is to be noted that in 3GPP UMTS network(s), gateway node(s) 1018 (e.g., GGSN) and tunnel interface (e.g., TTG) comprise a packet data gateway (PDG).

Macro network platform 1010 also includes serving node(s) 1016 that convey the various packetized flows of information, or data streams, received through gateway node(s) 1018. As an example, in a 3GPP UMTS network, serving node(s) can be embodied in serving GPRS support node(s) (SGSN).

As indicated above, server(s) 1014 in macro network platform 1010 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 1010. Data streams can be conveyed to gateway node(s) 1018 for authorization/authentication and initiation of a data session, and to serving node(s) 1016 for communication thereafter. Server(s) 1014 can also effect security (e.g., implement one or more firewalls) of macro network platform 1010 to ensure network's operation and data integrity in addition to authorization and authentication procedures that CS gateway node(s) 1012 and gateway node(s) 1018 can enact. Moreover, server(s) 1014 can provision services from external network(s), e.g., WAN 1050, or Global Positioning System (GPS) network(s) (not shown). It is to be noted that server(s) 1014 can include one or more processor configured to confer at least in part the functionality of macro network platform 1010. To that end, the one or more processor can execute code instructions stored in memory 1030, for example.

In example wireless environment 1000, memory 1030 stores information related to operation of macro network platform 1010. Information can include business data associated with subscribers; market plans and strategies, e.g., promotional campaigns, business partnerships; operational data for mobile devices served through macro network platform; service and privacy policies; end-user service logs for law enforcement; and so forth. Memory 1030 can also store information from at least one of telephony network(s) 1040, WAN 1050, or SS7 network 1060.

Regarding femto network platform 1080, it includes a femto gateway node(s) 1084, which have substantially the same functionality as PS gateway node(s) 1018. Additionally, femto gateway node(s) 1084 can also include substantially all functionality of serving node(s) 1016. Disparate gateway node(s) 1084 can control or operate disparate sets of deployed femto APs, which can be a part of femto RAN 1090. In an aspect of the subject innovation, femto gateway node(s) 1084 can aggregate operational data received from deployed femto APs. Moreover, femto gateway node(s) 1084, can convey received operational data to alarm component 1020.

Alarm component 1020 can operate in accordance with aspects and features described in the subject specification in connection with alarm component 210. It is noted that alarm component 1020 can include analysis component 410 and intelligence component 510. While illustrated as external to femto gateway node(s) 1084, it should be appreciated alarm component 1020 can be an integral part of gateway node(s) 1084. Alarm component 1020 can receive operational data from gateway node(s) 1084, to monitor operational quality of deployed femto APs. Alarm component 1020 can exploit memory 1086 to store aggregated operation data, and operational intelligence, in accordance with aspects herein, that results from observation of received operational data and predetermined operational quality indicator(s).

As mentioned above, memory 1086 can comprise aggregated data and operational intelligence include. In addition, memory 1086 can include performance rules and operational quality indicators for various service categories (see, e.g., FIG. 3), as described in the subject specification. Furthermore, memory 1086 can retain additional information relevant to operation of the various components of femto network platform 1080. For example operational information that can be stored in memory 1086 can comprise, but is not limited to, subscriber intelligence; contracted services; maintenance and service records; femto cell configuration (e.g., devices served through femto RAN 1090; authorized subscribers associated with one or more deployed femto APs); service policies and specifications; privacy policies; add-on features; so forth.

Server(s) 1082 have substantially the same functionality as described in connection with server(s) 1014. In an aspect, server(s) 1082 can execute multiple application(s) that provide service (e.g., voice and data) to wireless devices served through femto RAN 1090. Server(s) 1082 can also provide security features to femto network platform. In addition, server(s) 1082 can manage (e.g., schedule, queue, format . . . ) substantially all packetized flows (e.g., IP-based, frame relay-based, ATM-based) it generates in addition to data received from macro network platform 1010. Furthermore, server(s) 1082 can effect provisioning of femto cell service, and effect operations and maintenance. It is to be noted that server(s) 1082 can include one or more processors configured to provide at least in part the functionality of femto network platform 1080. To that end, the one or more processors can execute code instructions stored in memory 1086, for example.

It is to be noted that aspects, features, or advantages of the subject innovation described in the subject specification can be exploited in substantially any wireless communication technology. For instance, Wi-Fi, WiMAX, Enhanced GPRS, 3GPP LTE, 3GPP2 UMB, 3GPP UMTS, HSPA, or Zigbee. Additionally, substantially all aspects of the subject innovation as disclosed in the subject specification can be exploited in legacy telecommunication technologies; e.g., GSM.

In addition, it is to be noted that the various aspects disclosed in the subject specification can also be implemented through program modules stored in a memory (e.g., memory 1086 or memory 1255) and executed by a processor (e.g., processor 1235), or other combination of hardware and software, or hardware and firmware.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

What has been described above includes examples of systems and methods that provide advantages of the subject innovation. It is, of course, not possible to describe every conceivable combination of components or methodologies for purposes of describing the subject innovation, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method for gauging performance of a femto cell network, the method comprising:
   aggregating operational data collected from a set of femto access points (APs), the operational data is associated at least with performance of at least one of a voice or data call routed through the set of femto APs;
   assigning a weight to a subset of the set of femto APs from which operational data is received, wherein the subset includes two or more femto APs;
   monitoring an operational quality indicator (OQI) associated with the weight assigned to the subset of the set of femto APs, wherein the OQI is one of a function or logical variable that evaluates the performance; and
   generating an alarm indication when the OQI adopts at least one of a value below a threshold or a logic failure condition for the subset of the set of femto APs.

2. The method of claim 1, further comprising generating the OQI based at least in part on a set of performance rules and the aggregated operational data.

3. The method of claim 2, wherein the generating the OQI comprises determining the OQI based on at least one performance rule in the set of performance rules, which comprises at least one of a performance threshold, a sampling set, or the weight.

4. The method of claim 1, wherein the assigning the weight includes assigning a parameter that determines a number of femto APs within the subset of the set of femto APs, and reduces the scope of the aggregated operational data that is monitored.

5. The method of claim 4, further comprising:
   gathering intelligence on a set of subscribers from a network database;
   segmenting the set of subscribers based at least in part on the gathered intelligence; and
   for each subscriber segment, generating a customized performance rule for an associated OQI.

6. The method of claim 5, generating the customized performance rule for an associated OQI comprises:
   collecting data on a performance metric over a time interval for the set of femto APs;
   analyzing the collected data through at least one of computing a set of statistics, extracting patterns or cluster, or computing correlations among the collected data; and
   generating a set of performance rules based at least in part on the analyzed data and associated findings.

7. The method of claim 1, further comprising, selecting the OQI from a list of OQIs stored in a network database.

8. The method of claim 1, wherein the monitoring includes monitoring the OQI that assesses one of the following performance categories: femto cell service quality, mobility, femto cell network capacity, femto cell provisioning, femto cell configuration automation, or emergency call management.

9. The method of claim 8, wherein the monitoring includes monitoring the OQI that assesses at least one of a speech quality, a dropped call rate, a radio access bearer establishment, conversational quality, call setup time, or call end time.

10. The method of claim 8, wherein the monitoring includes monitoring the OQI that assesses at least one of a handover failure rate, a handover drop rate, or a handover interruption time for at least one handover between a femto cell and a macrocell.

11. The method of claim 8, wherein the monitoring includes monitoring the OQI that assesses a femto gateway node load.

12. The method of claim 8, wherein the monitoring includes monitoring the OQI that assesses at least one of a provisioning time, a location lockup time, or a recovery time.

13. The method of claim 1, wherein aggregating operational data collected from a set of femto access points (APs) comprises:
   receiving data associated with a set of performance metrics;
   selecting data associated with a subset of performance metrics that define at least in part an OQI, and retaining the selected data.

14. The method of claim 13, further comprising:
   requesting data on a selected performance metric for a set of femto APs; and
   collecting the requested data, and retaining the collected data.

15. The method of claim 14, further comprising retaining operational intelligence generated as a result of monitoring the OQI.

16. The method of claim 1, further comprising conveying the alarm indication to a femto cell network component.

17. The method of claim 1, the generating the alarm indication includes generating at least one of a set of multi-bit words, a graphical or audible token, a short message service (SMS) communication, a multimedia message service (MMS) communication, an email message, or an instant message.

18. A system, comprising:
   at least one processor that executes the following computer executable components stored on at least one non-transitory computer readable medium:

a component that receives operational data for a set of deployed femto cells, the operational data relates to performance of at least one of a voice or data call routed through the set of deployed femto cells;

a component that assigns a weight to a fraction of the set of femto cells from which operational data is received, wherein the fraction comprises at least two femto cells;

a component that monitors an operational quality indicator (OQI), associated with the that assesses performance of a femto cell in the set of deployed femto cells; and a component that issues and conveys an alarm indication when the OQI adopts at least one of a value below a performance threshold or a logic failure condition for the fraction of the set of deployed femto cells.

19. The system of claim 18, the component that receives the operational data selects data associated with a set of performance metrics that define at least in part the OQI, and aggregates the selected data.

20. The system of claim 19, the component that receives the operational data requests data on a selected performance metric from the set of deployed femto cells, and aggregates the requested data.

21. The system of claim 20, further comprising a component that generates the OQI based at least in part on a set of performance rules and the received operational data, or selects the OQI from a stored list.

22. The system of claim 21, wherein the OQI is associated with a performance rule, and wherein the performance rule comprises at least one of a performance threshold, a sampling set, the weight.

23. The system of claim 18, the weight is a parameter that determines the fraction of the set of deployed femto cells, wherein a number of femto APs in the fraction of deployed femto cells provides statistically significant data.

24. The system of claim 22, further comprising a component that generates a set of performance rules based at least in part on at least one of collected data on the selected performance metric over a time interval for a set of femto APs, or analysis of the collected data through at least one of a computation of a set of statistics, an extraction of patterns or clusters, or a computation of correlations among the collected data.

25. The system of claim 24, further comprising, a component that collects intelligence on a set of subscribers, infers a set of subscriber segments based at least in part on the collected intelligence, and generates the performance rule for at least a subscriber segment in the set of subscriber segments.

26. The system of claim 18, wherein the OQI assesses at least one of the following performance categories: femto cell service quality, mobility, femto cell network capacity, femto cell provisioning, femto cell configuration automation, or emergency call management.

27. The system of claim 18, wherein the component that monitors the OQI retains operational intelligence associated with the monitored operational data.

28. The system of claim 18, wherein the alarm indication is at least one of a set of multi-bit words, a graphical or audible token, a short message service (SMS) communication, a multimedia message service (MMS) communication, an email message, or an instant message.

29. At least one processor that executes computer executable instructions stored on at least one non-transitory computer readable medium to perform the following acts:

aggregating operational data collected from a set of deployed femto access points (APs);

selecting a plurality of APs from the set of deployed femto APs based in part on a weight assigned to the set of deployed femto APs from which operational data is collected;

monitoring an operational quality indicator (OQI) that is one of a function or logical variable that measures operational quality of the plurality of femto APs of the set of deployed femto APs; and generating and conveying an alarm when the OQI adopts one of a value below an operational threshold or a logic failure state for the plurality of femto APs of the set of deployed femto APs.

* * * * *